United States Patent Office 3,529,261
Patented Sept. 15, 1970

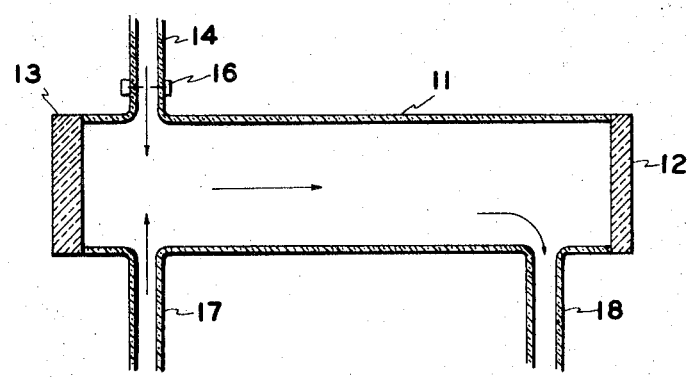

3,529,261
LASER HAVING AN ACTIVE MEDIUM WHICH IS AN EXCITED HALOGEN WHOSE LOWER ENERGY STATE IS DEPLETED BY REACTING WITH AN ALKALI METAL
Walter Roth, Rochester, N.Y., assignor to Xerox Corporation, Rochester, N.Y., a corporation of New York
Filed Sept. 10, 1964, Ser. No. 395,986
Int. Cl. H01s 3/09, 3/22
U.S. Cl. 331—94.5
12 Claims

ABSTRACT OF THE DISCLOSURE

Method and apparatus for achieving population inversion in a Laser by depleting those particles in a particle ensemble in the ground state or other lower energy state configuration by reacting them with a reagent which forms a compound with the lower energy state particles at a faster net rate than it does with higher energy state particles. The population inversion may also be accomplished by reacting the upper and lower energy state configurations with a compound which has a disassociative reaction such that the net disassociative rate of the upper energy compound exceeds the net disassociative rate of the lower energy state compound.

---

This invention relates in general to the generation or amplification of coherent electromagnetic radiation by the stimulated emission of radiation and more particularly, to a technique for achieving population inversion which is required to produce predominantly this type of emission.

Depending upon whether this technique is employed to amplify electromagnetic waves in the microwave or light portions of the electromagnetic spectrum, the technique is generally referred to by one of the two acronyms "Maser" or "Laser," which stand respectively for Microwave Amplification by the Stimulated Emission of Radiation and Light Amplification by the Stimulated Emission of Radiation. Even when these devices are operated as oscillators rather than amplifiers, they are referred to as Masers and Lasers, although these terms then become misnomers.

Both Lasers and Masers depend for their operation upon the fact that electromagnetic waves can interact with other elementary particles by virtue of changes in the internal energy of the particles. These particles, consisting, for example, of an assembly of electrons and an atomic nucleus, can assume only the motions and orientations which yield a discrete set of energies, referred to in the art as energy states or levels. Thus, a particle can interact with electromagnetic radiation only by making a transition from one discrete energy level to another or from the first energy state to the ground state. When the particle is in any one of the energy states above the ground state (an excited state), there is a definite probability that after a period of time, it will revert to the ground state with the emission of radiation. This probability has both a constant and a variable component with the constant component being substantially independent of incident radiation density, while the variable component of the probability for the downward or emissive transition to occur is found to depend upon the energy density of radiation (at the transition frequency) incident on the particle. Thus, the presence of radiation at the transition frequency increases the probability for the emission of radiation by a particle in any one of these upper states. The constant component of the transition probability is known as the probability of spontaneous emission of radiation and this spontaneous emission may even take place in the presence of radiation at the transition frequency. In this case, the emitted radiation will bear no coherent phase relationship to the incident radiation. On the other hand, however, incident radiation at the transition frequency increases the variable component of the probability of transition by inducing the particles to emit radiation which bears a definite phase relationship to the incident radiation and is referred to as the induced or stimulated emission of radiation. In the case of the Laser then, for example, the photon making up the emitted radiation is of the transition frequency and is therefore capable of stimulating a neighboring excited atom to emit in the same direction of travel as the original photon and in the same phase. External mirrors increase the effective length of the system by allowing the buildup of this cascade process.

It is accordingly seen that an assembly of particles in any energy state above the ground state is a potential source of electromagnetic energy gain. The problem is, however, made more complex by the fact that particles in the lower of two energy states, which may, for example, include the ground state, are found to absorb radiation at the transition frequency with a probability equal to that for stimulated emission from particles in the upper energy state. This absorption of energy is accompanied by an upward transition of the particle to a higher energy level. Accordingly, in order to obtain gain from the system, there must be a large excess of molecules in an upper energy level as compared with the number in a lower energy level, and this condition must be maintained during radiation exposure. Since, according to Boltzmann's law, the number of particles in any energy state will always be greater than the number of particles in the energy state immediately above it, when the system is in thermal equilibrium, the above described condition is a non-equilibrium condition which is referred to in the art as population inversion.

Many systems have been either proposed or used for the achievement of population inversion by the electrical or optical pumping of excited states. In most cases involving pumping of upper states, a large fraction of the pumped species are left in a ground electronic state. When the species are atomic, transitions to the ground state have no net effect because of re-absorption by existing ground state species. Since, at least for atomic species, ultraviolet transitions almost always must, and as a practical matter, do involve the ground state an ultraviolet, atomic Laser is ruled out if population inversion is to be achieved by pumping upper energy states. In addition, pumping techniques have many drawbacks which make them unsuitable for some uses. For example, with optical pumping, it is difficult to get intense enough light sources which can operate on a continuous basis; whereas, with electrical pumping, heat dissipation becomes a problem. In any case, it is highly improbable that a population inversion with respect to the ground state configuration can be achieved by optical or electrical pumping techniques.

Accordingly, it is an objective of this invention to define a novel device operating on the principle of the stimulated emission of radiation.

It is a further object of this invention to describe an apparatus and method which achieves population inversion by the depletion of a lower energy state, which may be a ground state.

Still another object of the invention is to define a method and apparatus in which lower energy state depletion, sufficient to produce population inversion, is achieved by direct selective chemical reaction.

The above and still further objects may be accomplished in accordance with the present invention, generally speaking, by selectively removing the ground state and one or more additional ones of the lowest energy states. For purposes of simplicity in description, the achievement of inversion by selectively removing only the ground state species will be considered first; however, it is to be understood that both the ground state species and one or more successively higher energy state species above the ground state may be selectively removed so as to achieve inversion between two higher states.

Removal of the ground state species is accomplished, for example, by preferential chemical reaction which proceeds more rapidly with a ground state species than higher excited state species. Thus, if a discharge in a gas A produces some ratio of excited atoms (A*) to unexcited (A) atoms; (A*/A), which is less than unity, a species B is injected for which the reaction A+B→AB proceeds much more rapidly than the reaction A*+B→ A*B. In the alternative, the two reactions may proceed at the same rate so long as the dissociative reaction is significantly more rapid for the reaction compound A*B than for the compound AB. This later requirement of more rapid dissociation is easily met by a diatomic molecule AB with a deeper ground state potential well than its excited state potential well. Actually, the reaction A*B+→A*B may even proceed somewhat more rapidly than the reaction A+B→A*B and still be suitable for achieving population inversion so long as the reverse dissociative reaction A*B→A*+B proceeds much more rapidly than the dissociative reaction AB→A+B.

Considering now, by way of example, a gas system in a Laser, portions of the gas A atoms are brought to the first and successively higher energy states above the ground state by any suitable technique such as microwave or optical excitation or an electric discharge in the gas. The gas, including both excited and unexcited atoms thereof, is then brought in contact with the second gas B which is selected so that it will selectively react with unexcited atoms of the gas A preferentially and not with excited atoms of the gas A*, thereby providing the desired population inversion between the first excited state and the ground state of the gas A, which is in this instance, the active medium. Whether the system is gaseous in nature or liquid, any suitable reagents A and B may be employed in carrying out the concept of the invention. Typical and preferred examples of reagents for use in the invention include any one of the alkali metals; lithium, sodium, potassium, rubidium or cesium as reagent B with any one of the halogen gases; fluorine, chlorine, bromine or iodine as reagent A. In a gas system, the alkali metals are, of course, in their vaporized form. A portion of the halogen atoms are excited to at least the first energy state above ground state by subjecting them to an electric discharge. This combination of reagents A and B constitute a preferred group of reagents for use in the invention because of the relatively deep potential well of the compound AB as compared to the potential well of A*B and the fact that the halogen atoms have a transition frequency from the first energy level to the ground state, which is in the frequency of ultraviolet light, making for a highly desirable and previously very difficult to achieve laser radiation frequency output.

Any suitable techniques may be employed for bringing the two reagents together. Thus, for example, in a cesium vapor-iodine system, a cylindrical T or Y shaped tube with two inlet channels near one end of the tube may be employed with the iodine being excited in an electrical discharge in one inlet channel of the tube while cesium vapor is supplied through the other inlet channel of the tube with the two vapors coming together at the junction and flowing down the cylinder to an outlet channel near the second end of the tube. The reaction begins at the junction of the inlet channels.

Any suitable third body may also be used in this two body system. Ordinarily, the third body will be used as an inert energy sink and carrier for the reagents and the excited species of the active medium. Typical materials having the properties of inertness and fairly high heat transfer are sulfur hexafluoride, and the rare gases (e.g. He, Ar, Kr, etc.). Use of a third body gas of this type also facilitates control of the concentration of the reagent gates in the system and control of their flow through the system. Even in cases where there are no population inversions continuing to exist after relatively long periods, continuous output can be achieved by adjusting the flow rate of the gases so as to be compatible with the duration of inversions produced therein. This technique produces what is, in effect, continuous inversion by supplying new material having an inverted population distribution as stimulated emission depopulates the excited states in the previously induced active medium, thereby making (C.W.) continuous wave operation possible.

It is to be noted that the technique of this invention may be used in a maser or laser, operating either as an amplifier or as an oscillator. Thus, when the radiation employed to trigger the cascade of stimulated coherent electromagnetic radiation comes from an external source, the device is operated as an amplifier; whereas, when the initial triggering radiation is a result of spontaneous emission within the device itself, it is operated as an oscillator.

If the ratio of population inversion in the device is sufficiently high, satisfactory operation may be obtained with one pass of electromagnetic radiation through the active medium. However, in most instances, a cavity will be employed to provide multiple reflections through the active medium so that the probability of a photon moving through the system striking an excited atom of the active medium will be sufficiently high to obtain efficient operation. Cavities of this type are known in the art and the simple types consist of two, flat, parallel reflecting surfaces bounding the active medium with at least one of the reflecting surfaces having a reflectivity of less than one so that a portion of the stimulated radiation can emerge from the cavity after one or more passes therethrough. If the device is operated as an amplifier, the reflector at the other end of the cavity will also have a higher transmittance or an aperture so that input radiation can be admitted through one end of the cavity while output radiation exits from the opposite end of the cavity. Where the cylindrical tube has reflectors at both ends, the inlet and outlet channels are, of course, preferably connected to the sides of the tube making up the cavity. The degree and rate of excitation which must be supplied, for example, by electric discharge or microwave, to the active medium, the flow rate and concentration of the active medium and the other reagent employed in the system as well as the characteristics of the active medium itself are all parameters which are determinative of the degree of population inversion which is achieved in the system. Although any population inversion ratio in excess of one is theoretically sufficient to produce a preponderance of stimulated, coherent emission, higher ratios are required in practice in order to compensate for cavity losses such as reflectivity losses, absorption losses in the windows, off-axis radiation losses and the like. A typical cavity of the type to be employed in carrying out this invention is shown in the figure. It is made up of a generally T-shaped tube 11 with two flat parallel reflecting surfaces 12 and 13 bounding the active medium in the tube. One of these reflecting surfaces must have a reflectivity of less than one, as pointed out supra. Inlet channels 14 and 17 are connected to the sides of the tube making up the cavity as in outlet channel 18. An electrical discharge electrode system 16 is provided inlet channel 14 so as to excite one of the inlet vapors such as iodine, as described above. This vapor then comes together with a reagent vapor such as cesium and the reaction proceeds as the two vapors move down the cylinder to the outlet channel 18 at the opposite end of the tube 11.

A particularly important feature of the inversion technique of this invention is that it may be used to great advantage in combination with other inversion techniques, such as electrical, optical or chemical pumping so that even where one or both of the inversion techniques produces an inadequate or borderline inversion to compensate for losses in the cavity, the two techniques when employed together, produce an adequate degree of population inversion. This system may also be used in conjunction with energy transfer pumping techniques of the type characterized by the well-known helium-neon gas Laser where energy is imparted to the atoms of one material and transferred to the atoms of the other by atom-to-atom collisions which raise the atoms of the second material to an excited condition. As will be apparent, this energy transfer may be taking place simultaneously with the depletion of unexcited atoms of the second material by the technique of this invention so as to achieve a higher degree of population inversion.

As should be obvious to those skilled in the art, this invention is also applicable to any reaction which will preferentially remove lower energy states relative to higher states rather than just those reactions of the atomic type discussed above. For example, the general reaction $A+BC \to AB+C$ and $A^*+BC \to AB^*+C$ may be employed providing that the former reaction proceeds at a faster net rate than the latter reaction.

What is claimed is:

1. The method of producing an inverted population distribution in the active medium of a device adapted to produce coherent, electromagnetic radiation by stimulated emission comprising
    raising a portion of the atoms of an active medium selected from the group consisting of chlorine, bromine, iodine and fluorine to at least one excited state above the ground state configuration to produce an ensemble of particles in various energy states, and
    bringing a reagent including an alkali metal into contact with the active medium, said reagent being selected so that it reacts to produce a compound with the atoms in the ground state configuration of the active medium at a net rate which exceeds the net rate with which it reacts to form a compound with atoms in the excited state at least until the number of atoms in an excited state exceeds the number remaining in the ground state configuration.

2. The method of claim 1 further including the step of pumping at least one energy state above the state being depleted.

3. The method of claim 2 in which the pumping and depletion steps are carried out at least until the ratio of particles in the higher energy state to the particles in the lower energy state exceeds unity.

4. The method of producing an inverted population distribution in a device adapted to produce coherent, electromagnetic radiation by stimulated emission comprising, raising at least a portion of the atoms of a gaseous active medium selected from the group consisting of chlorine, bromine, iodine and fluorine to at least one excited state above the ground state configuration and selectively depleting that portion of the atoms of the active medium remaining in the ground state configuration by reacting therewitn sufficient atoms of an alkali metal so that the number of atoms of said active medium in an excited state exceeds the number of unreacted atoms of the active medium remaining in the ground state configuration.

5. The method of producing an inverted population distribution in the cavity of a device adapted to produce coherent, electromagnetic radiation by stimulated emission comprising supplying atoms of an active medium selected from the group consisting of chlorine, bromine, iodine and fluorine to a cavity, raising a portion of the atoms of said active medium to at least one excited state above the ground state configuration, and supplying sufficient atoms of an alkali metal selected so that it will react to form a compound with atoms of the active medium in the ground state configuration at a faster net rate than the net rate with which it will form a compound with atoms of the active medium in said excited state so that the number of atoms in said excited state exceeds the number of atoms remaining in the ground state configuration.

6. The method according to claim 5 including the additional step of pumping atoms of the active medium to said excited state while simultaneously depleting atoms of the active medium from the ground state configuration by chemical reaction.

7. The method of electromagnetic wave amplification by the stimulated emission of radiation comprising
    raising a portion of the atoms of an active medium selected from the group consisting of chlorine, bromine, iodine and fluorine to an excited state while leaving the remainder thereof in a lower energy state to thereby form an ensemble of atoms,
    contacting said ensemble of atoms with a reagent including an alkali metal and characterized in its ability to react wtih said ensembled of atoms to produce a compound with the atoms in a lower energy state at a net rate which exceeds the net rate with which it reacts to form a compound with the atoms in an excited state at least until the ratio of atoms in the upper energy excited state to the atoms in the lower energy state exceeds unity, and
    exposing the active medium to electromagnetic radiation at the transition frequency, said radiation being of sufficient intensity to induce the excited atoms to emit stimulated, coherent radiation upon transition to the lower energy state.

8. An apparatus for the production of coherent, electromagnetic radiation by stimulated emission comprising a resonant cavity, an active medium selected from the group consisting of chlorine, bromine, iodine and fluorine means to raise a portion of the particles of said active medium to at least one excited state above the ground state configuraion to produce an ensemble of particles in various energy states, means to feed said ensemble of particles into said resonant cavity, a reagent including an alkali metal for the particles of said active medium, said reagent being characterized by its faster net rate of reaction with particles in the ground state configuration of said ensemble than with particles in the higher energy states, means to feed said reagent into said resonant cavity at a point adjacent the point of entry into said cavity of said ensemble of particles and an exit port in said resonant cavity for said ensemble of particles, said reagent and their reaction products, said exit port being remote from the points of entry into said resonant cavity of said ensemble of particles and said reagent.

9. An apparatus according to claim 8 further including means to apply pump energy to said ensemble of particles in said cavity.

10. The method of electromagnetic wave amplification by the stimulated emission of radiation comprising
    raising a portion of the atoms of an active medium selected from the group consisting of chlorine, bromine, iodine and fluorine to an excited state while leaving the remainder thereof in a lower state to thereby form an ensemble of atoms,
    contacting said ensemble of atoms with a reagent including an alkali metal characterized in its ability to react with said ensemble of atoms to produce a compound with each of the atoms in the different energy states which has a disassociative reaction such that the net disassociative rate of the excited state atoms exceeds the net disassociative rate of the lower energy state atoms at least until the ratio of atoms in the upper energy excied state to the aoms in the lower energy state exceeds unity, and exposing the active medium to electromagnetic radiation at the transition frequency, said radiation being of sufficient intensity to induce the excited atoms to emit stimulated, coherent radiation upon transition to the lower energy state.

11. The method of claim 10 further including the step of pumping at least one energy state above the lowermost energy state.

12. The method of claim 11 in which the pumping step is carried out at least until the ratio of particles in the higher energy state to the particles in the lower energy state exceeds unity.

References Cited

UNITED STATES PATENTS

| 3,388,314 | 6/1968 | Gould | 331—94.5 X |
| 3,302,127 | 1/1967 | Shao-Chi Lin | 331—94.5 |

OTHER REFERENCES

Polanyi: "Proposal for an Infrared Maser Dependent on Vibrational Excitation," Journal of Chemical Physics, vol. 34, pp. 347–48, January 1961.

Young: "Chemically Pumped Molecular Lasers," Journal of Chemical Physics, vol. 40, pp. 1848–53, April 1964.

RONALD L. WIBERT, Primary Examiner

E. BAUER, Assistant Examiner